US008750221B2

(12) United States Patent
Zembutsu et al.

(10) Patent No.: US 8,750,221 B2
(45) Date of Patent: *Jun. 10, 2014

(54) COMMUNICATION SYSTEM AND COMMUNICATION CONTROLLING METHOD

(75) Inventors: Hajime Zembutsu, Tokyo (JP); Toshiyuki Tamura, Tokyo (JP); Stefan Schmid, Heidelberg (DE); Tarik Taleb, Heidelberg (DE); Gottfried Punz, Heidelberg (DE)

(73) Assignees: NEC Corporation, Tokyo (JP); NEC Europe Ltd., Heidelberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/118,743

(22) Filed: May 31, 2011

(65) Prior Publication Data
US 2011/0286410 A1 Nov. 24, 2011

Related U.S. Application Data

(62) Division of application No. 13/131,810, filed as application No. PCT/JP2010/066211 on Sep. 17, 2010.

(30) Foreign Application Priority Data

Sep. 18, 2009 (JP) ................................. 2009-217757

(51) Int. Cl.
*H04W 4/00* (2009.01)
(52) U.S. Cl.
USPC .......................................... 370/329; 370/328

(58) Field of Classification Search
USPC .................................................. 370/328, 329
See application file for complete search history.

(56) References Cited

U.S. PATENT DOCUMENTS

| 5,602,839 | A | 2/1997 | Annapareddy et al. |
| 7,039,434 | B1 | 5/2006 | Matsumoto |
| 2004/0235477 | A1 | 11/2004 | Picha et al. |
| 2008/0259873 | A1 | 10/2008 | Ahmavaara et al. |
| 2008/0320149 | A1 | 12/2008 | Faccin |
| 2009/0047951 | A1 | 2/2009 | Yeoum et al. |
| 2009/0170426 | A1 | 7/2009 | Jung et al. |
| 2009/0232019 | A1 | 9/2009 | Gupta et al. |
| 2010/0039993 | A1 | 2/2010 | Ramankutty et al. |

(Continued)

FOREIGN PATENT DOCUMENTS

| CA | 2687503 A1 | 12/2008 |
| CN | 101136835 A | 3/2008 |

(Continued)

OTHER PUBLICATIONS

"Indication of Local IP Access", 3 GPP TSG RAN WG2 Meeting #66bis, R2-093764, Jun. 29-Jul. 3, 2009, pp. 1-2, Los Angeles, USA.

(Continued)

*Primary Examiner* — Kenny Lin
(74) *Attorney, Agent, or Firm* — Sughrue Mion, PLLC

(57) ABSTRACT

A communication method in LIPA/SIPTO architecture is provided which, when a user equipment (UE) is to connect from a serving area to an external network, allows re-selection of an optimal gateway. The communication method allows selecting a gateway apparatus physically or topologically close to a site, where the user equipment is attached.

15 Claims, 14 Drawing Sheets

(56) References Cited

U.S. PATENT DOCUMENTS

| | | | |
|---|---|---|---|
| 2010/0135245 A1 | 6/2010 | Zhu et al. | |
| 2010/0208658 A1 | 8/2010 | Vesterinen | |
| 2010/0284299 A1 | 11/2010 | Bi et al. | |
| 2010/0309881 A1 | 12/2010 | Kim et al. | |
| 2010/0323695 A1* | 12/2010 | Kallio et al. | 455/435.2 |
| 2010/0329205 A1 | 12/2010 | Bi et al. | |
| 2011/0045834 A1 | 2/2011 | Kim et al. | |
| 2011/0096660 A1* | 4/2011 | Ikeda et al. | 370/225 |
| 2011/0099604 A1 | 4/2011 | Zhou et al. | |
| 2012/0002608 A1 | 1/2012 | Vesterinen et al. | |
| 2012/0003980 A1 | 1/2012 | Lim et al. | |
| 2012/0151030 A1 | 6/2012 | Guttman et al. | |
| 2012/0182940 A1 | 7/2012 | Taleb et al. | |
| 2013/0279420 A1* | 10/2013 | Nishida et al. | 370/328 |
| 2013/0279421 A1* | 10/2013 | Nishida et al. | 370/328 |
| 2013/0286843 A1* | 10/2013 | Nishida et al. | 370/235 |

FOREIGN PATENT DOCUMENTS

| | | |
|---|---|---|
| CN | 101286915 A | 10/2008 |
| JP | 2013502190 A | 1/2013 |
| JP | 2013502803 A | 1/2013 |
| KR | 10-2009-0055668 A | 6/2009 |

OTHER PUBLICATIONS

"Selected IP Traffic Offload", 3GPP TSG-SA WG1 Meeting #47, SA-093341, Aug. 3-7, 2009, pp. 1-3, Rome, Italy.

"Update to the SA2 WID for Local IP Access & Internet Offload", 3GPP TSG-SA WG1 Meeting #47, S1-093338, Aug. 3-7, 2009, pp. 1-6, Rome, Italy.

Communication issued by the Korean Intellectual Property Office in corresponding Korean Application No. 2011-7031719 on Jan. 27, 2012.

Non-Final US Office Action, dated Jan. 30, 2012, issued by the U.S. Patent and Trademark Office in related U.S. Appl. No. 13/131,810.

U.S. Non-Final Office Action dated Jun. 20, 2012 issued in corresponding U.S. Appl. No. 13/149,264.

Extended Search Report dated Nov. 30, 2012 issued by the European Patent Office in corresponding European Patent Application No. 12155349.9.

"3rd Generation Partnership Project; Technical Specification Group Services and Systems Aspects; Telecommunication management; Performance measurements Evolved Packet Core Network (EPC)(Release9)", 3GPP TS 32.426, Sep. 1, 2009, pp. 1-47, XP002687391.

Nokia Siemens Networks, "DNS requirements", 3GPP TSG CT WG4 Meeting #39bis, Jul. 1, 2008, 2 pgs total, XP050040448.

"3rd Generation Partnership Project; Technical Specification Group Core Network and Terminals; Domain Name Systems Procedures; Stage 3 (Release 8)", 3GPP TS 29.303, Sep. 1, 2009, pp. 1-51, XP002687392.

Korean Office Action dated Aug. 20, 2012 issued by the Korean Intellectual Property Office in correpsonding Korean Patent Application No. 10-2011-7031719.

European Search Report dated Oct. 25, 2012 issued by the European Patent Office in corresponding European Patent Application No. 12155753.2.

Huawei: "Discussion on SGW Selection", 3GPP TSG CT WG4 Meeting #40, Budapest, Hungary, Aug. 2008, 1 pg total, XP050314138.

Office Action dated Jan. 5, 2013 issued by the State Intellectual Property Office of P.R. China in corresponding Chinese Patent Application No. 201110461305.9.

European Search Report dated Oct. 31, 2012, issued by the European Patent Office in corresponding European Patent Application No. 10817286.7.

"3rd Generation Partnership Project; Technical Specification Group Services and System Aspects; Local IP Access and Selected IP Traffic Offload; (Release 10)", 3GPP TR 23.8xy V0.2.0, Sep. 2009, 19 pgs total, XP-002685317.

Telecom Italia, "PDN GW relocation for Dual-Stack Mobile IPv6", 3GPP TSG SA WG2 Meeting #61-SAE drafting ad-hoc, Nov. 9, 2007, 7 pgs total, XP-050261661.

Korean Notice of Allowance dated Sep. 18, 2012 issued by the Korean Patent Office in corresponding Korean Patent Application No. 10-2011-7031718.

Non-Final U.S. Office Action, issued by the USPTO in related U.S. Appl. No. 13/149,264 on Feb. 7, 2012.

Communication dated Jun. 25, 2013 issued by the Japanese Patent Office in counterpart Japanese Application No. 2011277587.

Communication dated Dec. 4, 2013, issued by the State Intellectual Property Office of the People's Republic of China in corresponding Application No. 201110461311.4.

Communication dated Dec. 19, 2013, issued by the State Intellectual Property Office of the People's Republic of China in corresponding Application No. 201080029555.9.

Communication, dated Mar. 26, 2012, issued by the Canadian Intellectual Property Office in corresponding Canadian Application No. 2,764,054.

Communication, dated Feb. 22, 2012, issued by the Korean Intellectual Property Office in corresponding Korean Application No. 2011-7031718.

* cited by examiner

COMMUNICATION SYSTEM AND COMMUNICATION CONTROLLING METHOD

CROSS REFERENCE TO RELATED APPLICATIONS

This application is a divisional of U.S. patent application Ser. No. 13/131,810, filed May 27, 2011, which is a national stage of International Application No. PCT/JP2010/066211, filed Sep. 17, 2010, claiming priority based on Japanese Patent Application No. 2009-217757, filed Sep. 18, 2009, the contents of all of which are incorporated herein by reference in their entirety.

TECHNICAL FIELD

This invention relates to a mobile communication system and, more particularly, to a system optimal for re-selection of a gateway that connects a terminal to a packet data network. This invention also relates to a communication controlling method.

BACKGROUND

In EPC (Evolved Packet Core), bearer management is performed based on an 'Always On' concept in such a manner that a PGW (PDN (Packet Data Network) Gateway), initially selected when a UE (User Equipment or 'terminal') has attached the EPC, is fixedly used as anchor until the UE detaches. By this manner of operation, it is possible for a service network (a packet data network) to provide services premised on permanent connection. It is because the IP information driven out by the PGW is unchanged even if the UE moves repeatedly within the EPC.

When a UE moves within the EPC, an SGW (Serving Gateway) is re-selected in accompaniment with the movement of the UE. Each time the SGW is re-selected, a bearer between the SGW and the PGW is updated by disconnection and re-establishment to ensure connectivity from the UE to the PGW.

In general, in selecting a PGW, such a PGW is selected which is close to the SGW physically or from the perspective of network topology.

However, in case the UE performs repeated movement over long distances or has stayed in a far-away place after such long-distance movement, the PGW, initially selected, may be far away from a SGW in terms of a distance (a physical or network topological distance). As a result, network efficiency is deteriorated to present problems such as transmission delay of user data or inefficient consumption of network resources within the EPC.

For example, when a passenger to Japan from abroad enters at Narita International Airport, he/she may usually power-up the mobile phone apparatus at the International Airport to attach to EPC. Hence, a PGW located close to Narita International Airport is selected. However, after entrance to Japan, he/she may move to e.g., Tokyo, Osaka, Sapporo or Fukuoka. Hence, after each such movement, the PGW close to the Narita International Airport is no longer the most efficient PGW.

SUMMARY

The following is an analysis by the present inventors. In the EPC network, a default bearer, established at the time of attachment, is not deleted/re-established until the time of detachment under the 'Always On' principle. If the bearer is to be switched due to UE's movement, the PGW, selected at the time of attachment, remains fixed as anchor.

Consequently, such a problem is raised that, when a UE moves over a long distance, maintaining connection to the PGW selected at the time of the attachment may be inefficient from the perspective of EPC network.

Such a system is thus desired that, when a UE moves over a long distance, and the UE is to connect from a serving area in which the UE resides to an external network (service network), allows re-selecting an optimal PGW (result of analysis by the present inventors).

It is therefore an object of the present invention to provide a system and a method, which make it possible to re-select an optimal gateway node, when a terminal (UE) is to connect from a serving area to an external network.

In one aspect of the present invention, there is provided in one aspect of the present invention, there is provided a communication method in Local IP Access (LIPA)/Selected IP Traffic Offload (SIPTO) architecture, wherein a gateway apparatus physically or topologically close to a site, where the user equipment is attached, is selected according to movement of the user equipment.

According to the present invention, there is provided a communication system in Local IP Access (LIPA)/Selected IP Traffic Offload (SIPTO) architecture, wherein a gateway apparatus physically or topologically close to a site, where the user equipment is attached, is selected, according to movement of the user equipment.

According to the present invention, there is provided user equipment in a communication system by Local IP Access (LIPA)/Selected IP Traffic Offload (SIPTO) architecture, wherein a gateway apparatus physically or topologically close to a site, where the user equipment is attached, is selected, according to movement of the user equipment.

In another aspect of the present invention, there is provided a communication method in Local IP Access (LIPA)/Selected IP Traffic Offload (SIPTO) architecture, wherein, in case a mobility management entity (MME) decides that it is necessary to re-select a gateway apparatus, the MME sends a first signal for setting re-attachment to a user equipment, the user equipment on receipt of the first signal transmitting a second signal for re-attachment to the MME and the MME re-selecting the gateway apparatus.

According to the present invention, there is provided a communication system in Local IP Access (LIPA)/Selected IP Traffic Offload (SIPTO) architecture, comprising a mobility management entity (MME) and a user equipment, wherein the MME sends a first signal for setting re-attachment, when the MME decides that it is necessary to re-select a gateway apparatus, the user equipment sends a second signal for re-attachment to the MME, on receipt of the first signal, and the MME re-selects the gateway apparatus.

According to the present invention, there is provided a user equipment in a communication system by Local IP Access (LIPA)/Selected IP Traffic Offload (SIPTO) architecture, wherein the user equipment receives a first signal that sets re-attachment from a mobility management entity (MME) and sends a second signal for re-attachment to the MME to cause re-selection of a gateway apparatus to be performed.

In yet another aspect of the present invention, there is provided a communication method in Local IP Access (LIPA)/Selected IP Traffic Offload (SIPTO) architecture, wherein the method comprises:

the MME sending a deactivate bearer request (Deactivate Bearer request), requesting re-selection, to a base station, when a mobility management entity (MME) decides that it is necessary to re-select a gateway apparatus;

the base station sending an RRC connection reconfiguration (RRC connection reconfiguration) to a user equipment; and the user equipment sending a notification of completion of an RRC connection reconfiguration (RRC connection reconfiguration) to the base station;

the base station sending a deactivate bearer response (Deactivate Bearer response) to the MME; and the user equipment initiating a UE requested PDN connectivity (UE requested PDN connectivity) procedure, as a result, re-selection of a gateway apparatus being performed.

According to the present invention, there is provide a communication system in Local IP Access (LIPA)/Selected IP Traffic Offload (SIPTO) architecture, comprising:

a mobility management entity (MME);

a base station; and a user equipment, wherein when the MME decides that it is necessary to re-select a gateway apparatus, the MME sends a deactivate bearer request (Deactivate Bearer request), requesting re-selection, to the base station, the base station sends an RRC connection reconfiguration (RRC connection reconfiguration) to the user equipment, the user equipment sends a notification of completion of the RRC connection reconfiguration (RRC connection reconfiguration) to the base station, the base station sends a deactivate bearer response (Deactivate Bearer response) to the MME, the user equipment initiates a UE requested PDN connectivity (UE requested PDN connectivity) procedure to cause re-selection of a gateway apparatus to be performed.

According to the present invention, there is provided a user equipment in a communication system by Local IP Access (LIPA)/Selected IP Traffic Offload (SIPTO) architecture, wherein, in case of receiving an RRC connection reconfiguration from the base station, the user equipment sends a notification of completion of RRC connection reconfiguration to the base station to initiate a UE requested PDN connectivity procedure to cause re-selection of a gateway apparatus to be performed.

According to the present invention, it is possible to re-select an optimal gateway node at a time when a user equipment is to connect from a serving area to an external network (service network).

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

PREFERRED MODES

The following describes exemplary embodiments of the present invention will now be described. A system according to one of modes of the present invention re-selects a PGW (PDN gateway) in EPC in keeping with movement of a user equipment (UE) and re-establishes a default bearer, thereby realizing improvement of transmission delay and efficiency of network resources in the EPC.

In current 3GPP standardization, such techniques, termed LIPA (Local IP Access) or SIPTO (Selected IP Traffic Offload), are under study. In these techniques, user traffic is not taken into EPC and is made to have direct access to an external packet network from a radio access network, in which a UE resides. In case the present invention is adapted to cooperate with the LIPA/SIPTO architecture, it becomes possible to realize efficient utilization of network resource more effectively.

In a system according to an exemplary embodiment of the present invention, a PGW is re-selected for a UE which is being attached to the EPC.

An EPC bearer usually uses in a fixed manner, a PGW which is initially selected when a UE is attached (registered) to the EPC network, as an anchor, until the UE is detached (deleted from registration). However, in case the UE moves over a long distance, it may occur frequently that the PGW initially selected ceases to be a most efficient gateway apparatus for the external network.

In one of modes of the present invention, a path (bearer) between a UE and a PGW may be optimized by re-selecting and modifying the PGW, such as when the UE is in an idle state.

In one of modes of the present invention, a default bearer is re-established, with the re-selection of as the PGW, when the UE is not involved in packet communication, i.e., when the UE is in idle mode. By so doing, network resources between UE and PGW may be optimized without detracting from the user experience.

Figure 2:
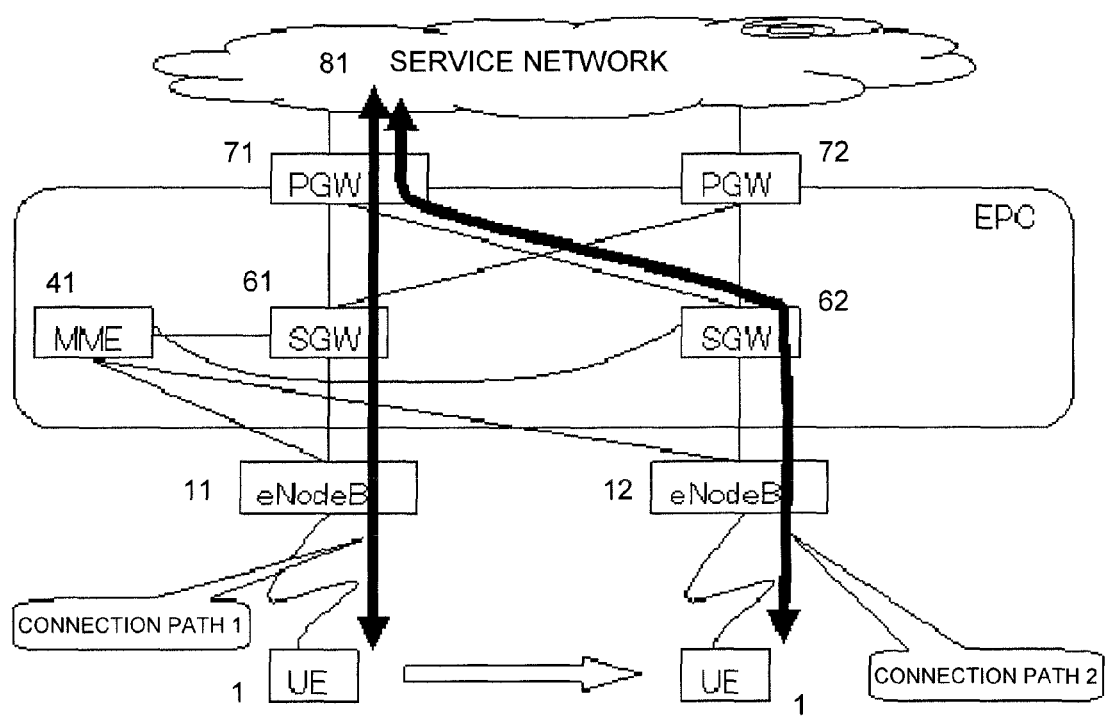
FIG. 2 is a diagram for explaining a Comparative Example.

The following describes the operation in case the UE moved astride an SGW. FIG. 2 shows, as Comparative Example, a case where the present invention is not applied. Referring to FIG. 2, since the UE is attached to an SGW 61 on the left side of FIG. 2, a PGW 71, which is closer to the left side SGW 61 in a physical distance or a network-topological distance, is initially selected, and a connection path 1 is set. When the UE is moved a long distance, the UE continues to use the left-side PGW 71. Hence, the UE and the PGW are connected by an inefficient connection path 2.

Figure 3:
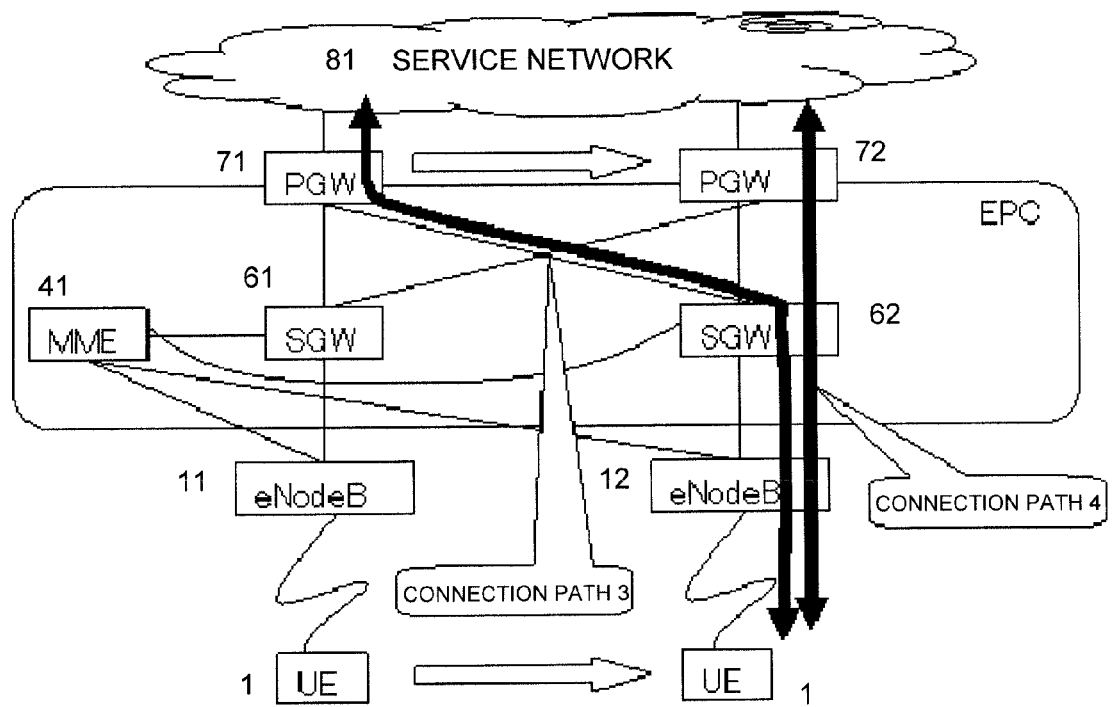
FIG. 3 is a diagram for explaining the present invention.

In contrast, FIG. 3 shows a case where the UE moves astride the SGW, as the present invention is applied. Referring to FIG. 3, since the UE is attached to the SGW 61 on the left side of FIG. 3, the PGW 71, closer to the left side SGW 61 in a physical distance or a network-topological distance, is initially selected, and a connection path 3 is set. The EPC then re-examines the connectivity between the UE and the external network (service network), using the UE's movement over the large distance as a trigger. As a result of the re-check, the EPC gives a decision that a right-side PGW2 provides a more efficient connection (UE-PGW path) than the left-side PGW 71. Hence, the path between the UE and the PGW is changed over from the connection path 3 to the connection path 4, thus assuring more efficient connection. The present invention will now be described with reference to exemplary embodiments.

Exemplary Embodiment 1

Figure 1:
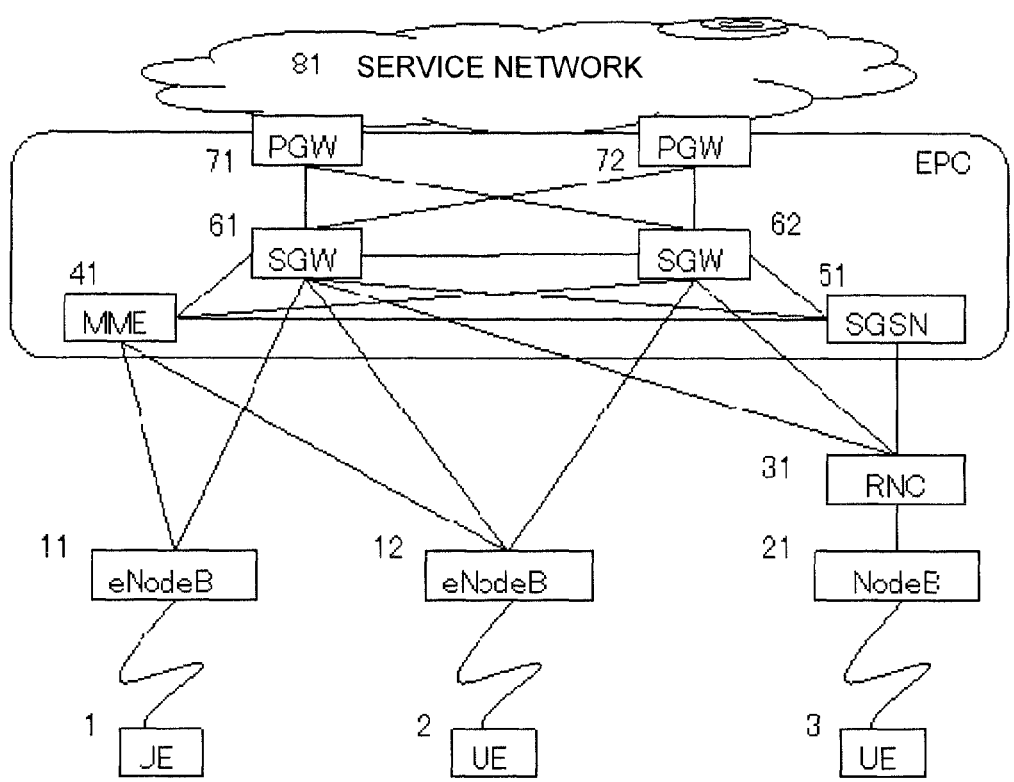
FIG. 1 is a diagram showing a entire configuration of a system according to an exemplary embodiment of the present invention.

FIG. 1 shows the arrangement of a network system according of the present exemplary embodiment. The basic arrangement itself of the network remains unchanged from a hitherto-used EPC network arrangement.

Referring to FIG. 1, UE1 to UE3 are mobile phones. In FIG. 1, eNodeB (evolved Node B) are base stations of LTE (Long Term Evolution), while NodeB 21 and RNC (Radio Network Controller) 31 are apparatuses for radio access adopted in the UMTS (Universal Mobile Telecommunication System).

An MME (Mobility Management Entity) 41 is an apparatus for mobility management as introduced by EPC.

An SGSN (Serving GPRS (General Packet Radio Service) Support Node) 51 is a serving apparatus, used for UMTS, and may or may not handle a user plane processing, depending on a connection modes.

In case the SGSN does not handle a user plane, the user plane is set between the SGW (Serving Gateway) and the RNC.

SGWs 61 and 62 are serving apparatuses that may handle the user plane. PGW 71 and 72 are gateway apparatuses that connect an external network (a service network 81 in the drawing) and RNC.

The following describes the operation of the present exemplary embodiment. Initially, an update procedure of a tracking area (TA Update Procedure) will be described with reference to a Comparative Example to which the present invention is not applied.

Figure 4:
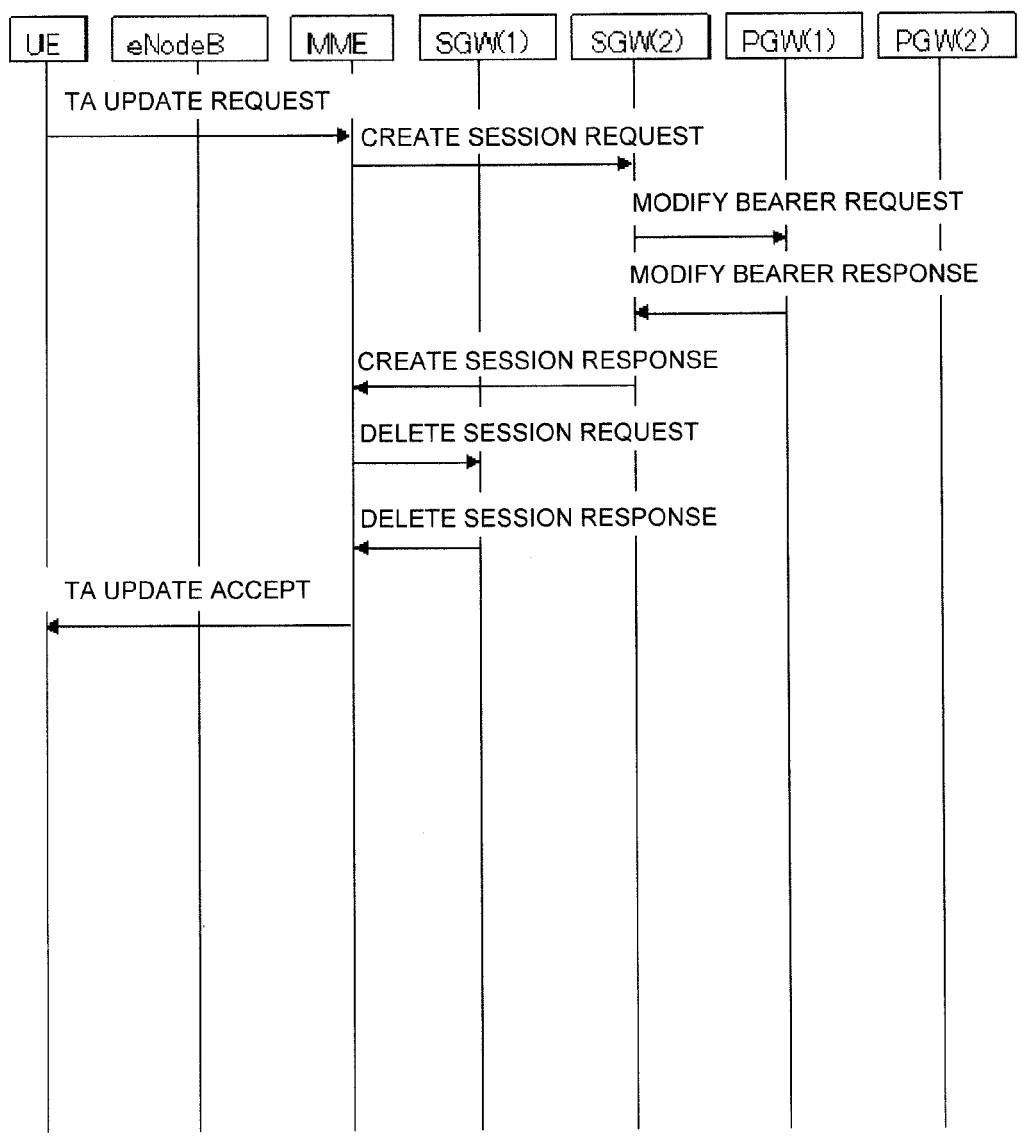
FIG. 4 is a diagram illustrating a sequence of the Comparative Example.

FIG. 4 shows a case of TA update accompanied by SGW change (Comparative Example). It is noted that, when a UE is in idle condition, that is, in a no-connection state, it is managed to which tracking area (position registration area) the UE belongs, however, it is not managed in which cell the UE resides.

MME receives a TA update request (TA Update Request) from the UE and, if it is determined that SGW needs to be changed, a create session request (Create Session Request) is sent to an SGW (2) which is a change-target SGW.

The SGW(2) sends a modify bearer request (Modify Bearer Request) to the PGW (1) to notify the PGW (1) of the fact that the SGW as destination of connection is changed.

On completion of update of the bearer context information, the PGW (1) sends a response to the modify bearer request (Modify Bearer Response) to the SGW (2).

On receipt of the response to the modify bearer request (Modify Bearer Response) from the PGW (1), the SGW (2) sends a create session response (Create Session Response) to the MME.

On receipt of the create session response (normal response) from the SGW (2), the MME sends a delete session request (Delete Session Request) to the SGW (1), which is a change-source SGW.

After deletion of the bearer context, the SGW (1) sends a delete session response (Delete Session Response) to the MME.

On receipt of the delete session response (Delete Session Response) from the SGW (1), the MME sends a TA (Tracking Access) accept (TA accept) to the UE.

Figure 5:
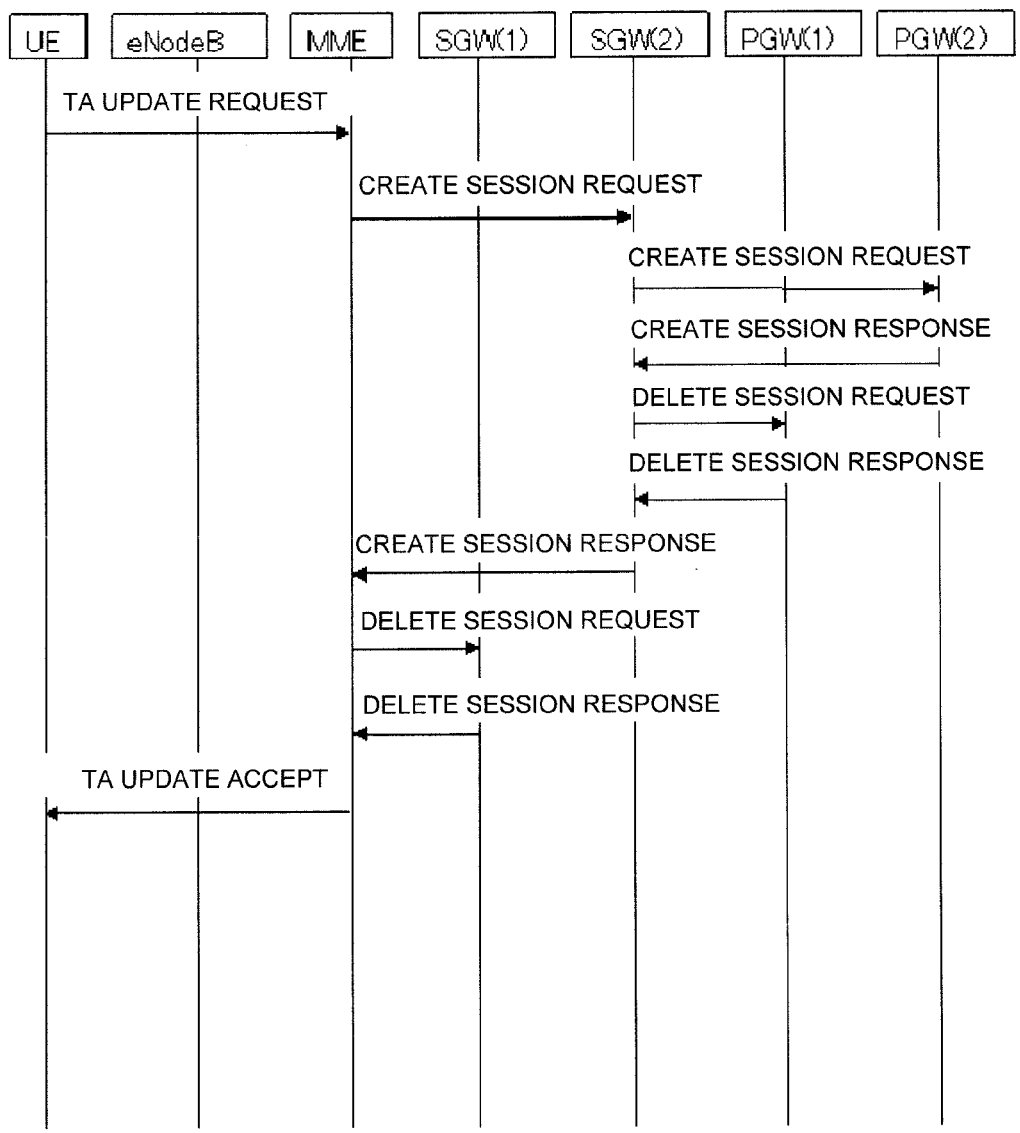
FIG. 5 is a diagram illustrating a sequence of an exemplary embodiment 1 of the present invention.

In contrast to the Comparative Example, shown in FIG. 4, the sequence operation shown in FIG. 5 is carried out in an exemplary embodiment of the present invention. The following describes the sequence of the present exemplary embodiment with reference to FIG. 5.

The MME receives a TA update request (TA Update Request) from the UE. In case the MME decides that the SGW is to be changed, the MME sends a create session request (Create Session Request) to the SWG (2) which is a change-target SGW.

In case the MME decides that PGW re-arrangement is necessary, the MME selects a PGW (2) that can be efficiently connected to the external network (service network), and sets address information that identifies the PGW, in the create session request (Create Session Request).

The SGW (2), on receipt of the new PGW address, sends a create session request (Create Session Request) to the PGW (2).

The PGW (2), responsive to the create session request (Create Session Request) sent from the SGW (2), creates a bearer context. The PGW (2) also assigns a new IP address for the user to the UE. After completion of assignment of the new IP address for the user and creation of the bearer context, the PGW (2) sends a create session response (Create Session Response) to the SGW (2).

The SGW (2), responsive to the create session response (Create Session Request) from the PGW (2), sends a delete session request (Delete Session Request) to the PGW (1).

The PGW (1) deletes the bearer context and sends a delete session response (Delete Session Response) to the SGW (2).

The SGW (2), responsive to the delete session response (Delete Session Response) from the PGW (1), sends a create session response (Create Session Response) to the MME.

The MME, responsive to a normal response from the SGW (2), sends a delete session request (Delete Session Request) to the SGW (1), which is the change-source SGW.

After deleting bearer context, the SGW (1) sends a delete session response (Delete Session Response) to the MME.

On receipt of the response, the MME sends a TA update accept (TA Update Accept) to the user. The IP information, newly assigned to the user, is set in the TA Update Accept and notified to the UE.

In the foregoing, such a case has been explained in which GTPv2 protocol (GPRS (General Packet Radio Service) Tunneling Protocol v2) is used between SGW and PGW. Similar functions may be implemented for such a case where PMIPv6 (Proxy Mobile IPv6) is used.

In case of using PMIPv6 between the SGW and the PGW, Proxy Binding Update is used in place of Create Session Request/Delete Session Request. Also, Proxy Binding Acknowledgement is used in place of Create Session Response/Delete Session Response.

The sequence to re-select a PGW is as shown in FIG. 5. To implement the above functions, it is necessary for an MME to re-select a PGW at an appropriate timing.

If, during when a UE is performing packet communication, a PGW connected to a service network is changed, the information such as IP address is changed for a communication counterpart of the UE. As a result, the packet communication by the UE is disconnected. Thus, in the operation shown in FIG. 5, it is necessary to re-select a PGW, during when the UE is not performing packet communication, that is, during ECM (EPS Connection Management)–IDLE time).

FIG. 5 shows the operation when an SGW is changed. However, even in case an SGW is not changed, the basic operation is the same. The message sequence, shown in FIG. 5, is explained using message names for a case where the communication between an SGW and a PGW is implemented in accordance with GTP protocol. However, similar effects may also be obtained in case the communication between the SGW and the PGW is implemented in accordance with PMIP (Proxy Mobile IP) protocol.

If, in FIG. 5, an SGSN is substituted for an MME, the operation is that of PGW re-selection in case an access network is UMTS.

In the present exemplary embodiment, described above, the following operation and advantageous effect may be obtained.

The selection of PGW based on the position in which a UE resides becomes possible. Since a PGW which is of a physically short distance from the UE or network-topologically close to the UE is selected and connected to the UE, network resources may be optimized by efficient connection.

User data transmission delay may be reduced by efficient path connection between the UE and the PGW.

Cooperated with the LIPA/SIPTO architecture, it becomes possible to provide packet communication services without user data being taken into the EPC. Hence, it becomes possible for a mobile communication operator to reduce a load of an EPC network apparatus.

Exemplary Embodiment 2

Figure 6:
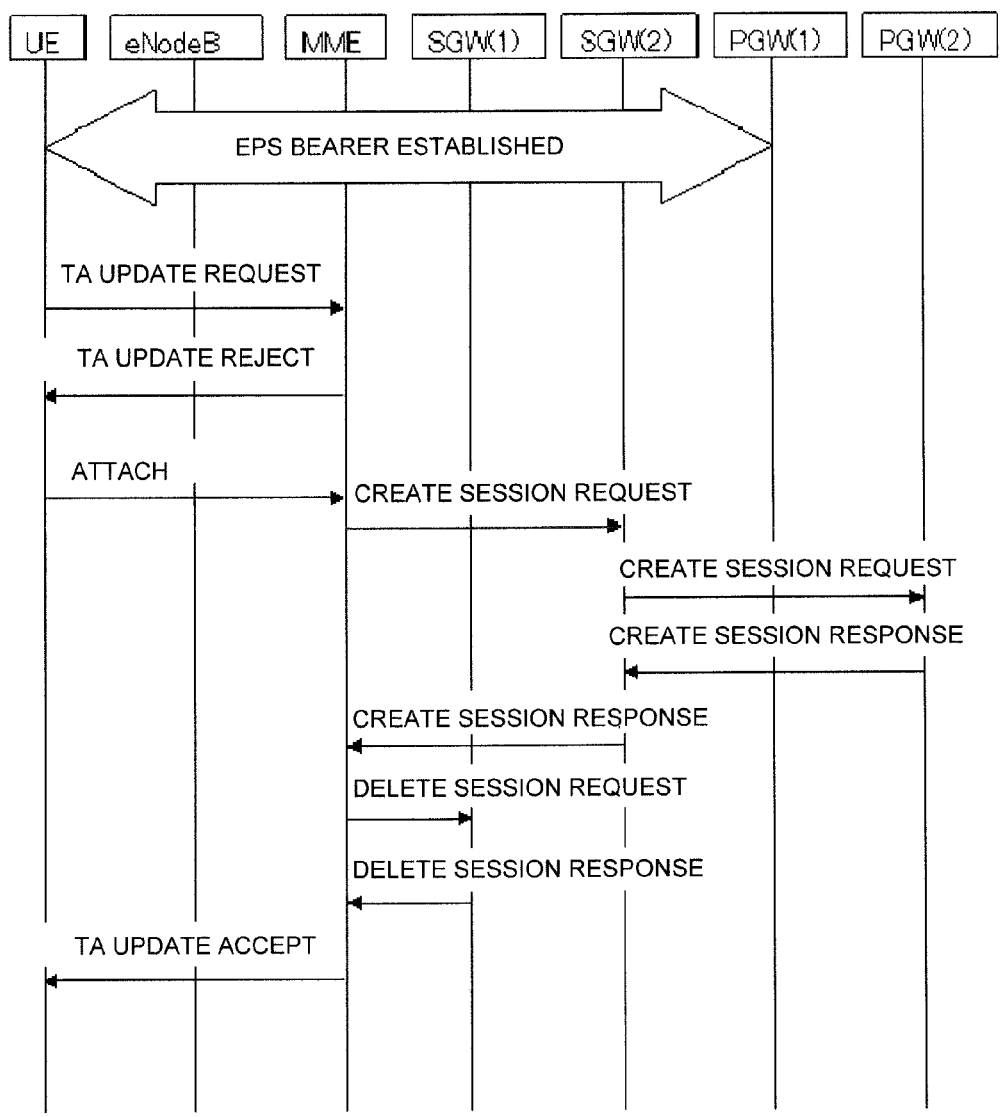
FIG. 6 is a diagram illustrating a sequence of an exemplary embodiment 2 of the present invention.

The following describes a second exemplary embodiment of the present invention with reference to FIG. 6. On receipt of a TA update request (TA Update Request), sent from a terminal (UE), MME examines whether or not a PGW, to which the UE is connected, is appropriate.

FIG. 6 shows a status in which a UE is connected to a PGW (1) (an EPS bearer established between the UE and the PGW (1): EPS bearer originally established).

In case the MME decides that re-selection of another suitable PGW is necessary, the MME sets a cause value that urges re-attach in a TA update request (TA Update Request) to send a TA update reject (TA Update Reject) to the UE.

In response to the TA update reject (TA Update Reject) from the MME, the UE sends an attach (ATTACH) signal to the MME. On receipt of the TA update reject (TA Update Reject), the MME is able to newly start up a logic for selecting a PGW, as a result of which an optimal PGW is re-selected.

In the example of FIG. 6, such a case is shown in which a PGW (2) is re-selected to perform a connection procedure to the PGW (2). That is, a create session request (Create Session Request) from the MME is sent to the SGM (2) and the create session request (Create Session Request) is sent from the SGW (2) to the PGW (2). On receipt of a create session response (Create Session Response) from the PGW (2), the SGW (2) sends the create session response to the MME. MME sends a delete session request (Delete Session Request) to the SGW (1). The SGW (1) returns a delete session response (Delete Session Response) to the MME. On receipt of the delete session response, the MME returns TA Update Accept which indicates the completion of TA update, to the terminal (UE).

In the present exemplary embodiment, the following operation and advantageous effect may be obtained.

In the present exemplary embodiment 2, no impact is imposed on a UE in the first exemplary embodiment, while minimum changes may suffice insofar as the EPC is concerned.

Exemplary Embodiment 3

Figure 7:
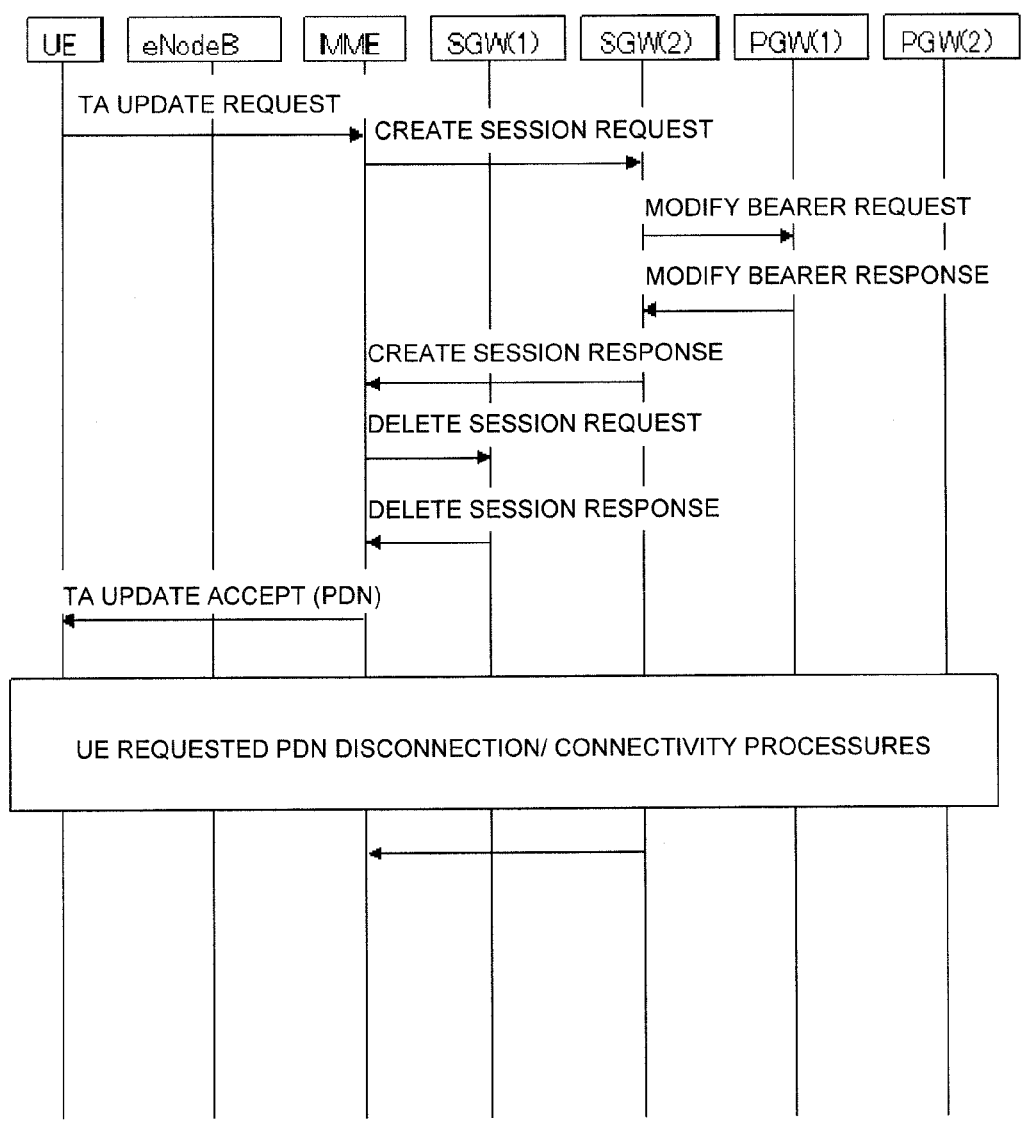
FIG. 7 is a diagram illustrating a sequence of an exemplary embodiment 3 of the present invention.

The following describes a third exemplary embodiment of the present invention with reference to FIG. 7. In the present exemplary embodiment, the usual TA update procedure is slightly changed.

The sequence shown in FIG. 7 is a normal TA update procedure. As a point of change in the present exemplary embodiment, completion of the TA update procedure is notified from an MME to a UE.

Referring to FIG. 7, on receipt of a TA update request (TA Update Request) from the UE, the MME sends a create session request (Create Session Request) to the SGW (2). A modify bearer request (Modify Bearer Request) is sent from the SGW (2) to the PGW (1). On receipt of a create session response (Create Session Response) from the SGW (2), the MME sends a delete session request (Delete Session Request) to the SGW (1). On receipt of the delete session response (Delete Session Response) from the SGW (1), the MME sends a TA update accept (TA Update Accept (PDN)).

In the present exemplary embodiment, new information, that is, PDN of the TA Update Accept (PDN) in FIG. 7, is added to a TA Update Accept signal to urge re-connection of the packet data network (PDN) which is currently in a connected state.

On receipt of the TA update accept (TA Update Accept) signal, added by the new information (PDN), the UE recognizes the PDN (packet data network) for re-connection, based on the information specified. It is noted that a plurality of PDNs may sometimes be so added. For the PDN, the UE starts up a UE requested PDN Disconnection processing (processing of disconnection of the PDN as requested by the UE) or a UE requested PDN connectivity processing (processing of connection of the PDN as requested by the UE) to re-connect the packet data network (PDN).

In this re-connection of the packet data network (PDN), it is possible for the MME to newly start up the PGW selection logic. As a result, it is necessary to re-select an optimum PGW.

FIG. 7 shows the operation for the case where the SGW is changed. However, even when the SGW is not changed, the basic operation remains the same.

The present exemplary embodiment has the following operation and meritorious effect:

According to the present exemplary embodiment, PGW re-connection may be made without starting up ATTACH processing (re-attach).

Starting up ATACH processing means that, if there are a plurality of PDN connections, processing for PGW re-selection is started up for the entire PDN connections, and hence the processing of a relatively large scale is invoked.

With the present exemplary embodiment, in contrast, only the re-selection of the PGW needed may be made by EPC startup.

Exemplary Embodiment 4

Figure 8:
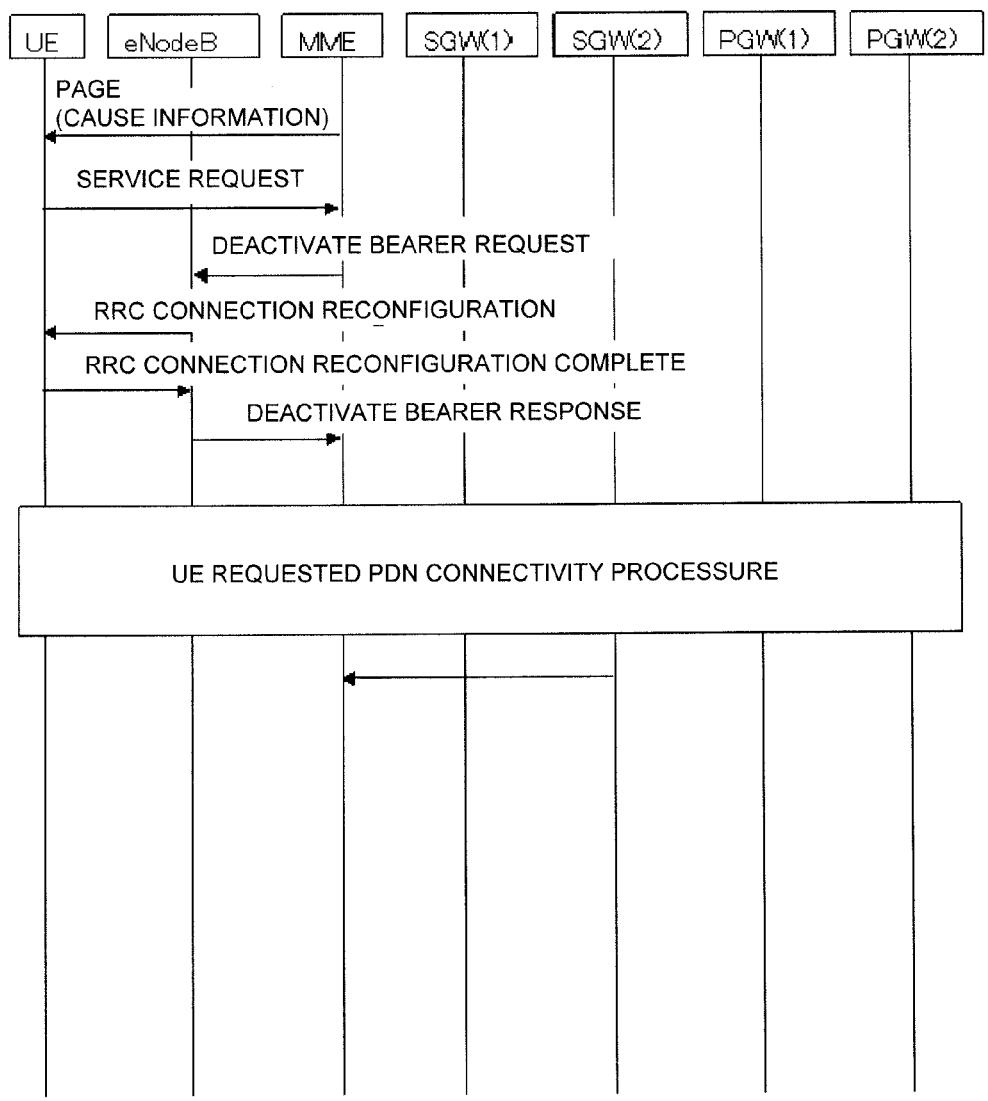
FIG. 8 is a diagram illustrating a sequence of an exemplary embodiment 4 of the present invention.

The following described a fourth exemplary embodiment of the present invention with reference to FIG. 8. In the fourth exemplary embodiment of the present invention, PGW re-selection, which may be started up by the EPC (MME) at an optional timing, is made in a manner not dependent upon the TA update procedure carried out by the UE. If, when the MME is in a connected state, PGW re-selection is decided to be necessary, a Page signal is sent to the UE and the connection with the UE is tried.

It is noted that the cause information (reason information) is added as an option to the Page signal. See Page (cause) of FIG. 8. The UE is allowed to neglect this Page signal (Page signal with the cause information). This is a measure taken in order to avoid battery consumption in the UE caused by iterative execution of this processing.

Inherently, the Page signal is a signal used for notification of an incoming call. In contrast, the Page signal, sent in case PGW re-selection is needed, is for enhancing the efficiency of the connection path in the EPC, such that it may not be said to be an indispensable operation. On receipt of this Page signal, the UE sends a service request (Service request) signal to the MME for communication therewith. The MME sends a deactivate bearer request (Deactivate Bearer request) from the MME to the eNodeB. The eNodeB sends an RRC connection reconfiguration. On receipt of a notification of completion of the RRC connection reconfiguration from the UE, the eNodeB sends a deactivate bearer response (Deactivate Bearer Response) to the MME.

The MME then disconnects the connection of the packet data network (PDN), for which PGW re-selection is necessary, to induce the procedure of UE requested packet data network connection from the UE (UE requested PDN connectivity).

By carrying out this procedure, it becomes possible for the MME to newly start up the PGW selection logic. Thus, as a result, re-selection of suitable PGW becomes necessary. For this procedure, the EPC (MME) is able to start up PGW re-connection at an optional timing. In this case, O&M (Operation and Maintenance), LIPA or SIPTO connection/disconnection may be used as a trigger.

In the present exemplary embodiment, such operation and meritorious effect may be obtained that the MME may re-select PGW at an optional timing.

Exemplary Embodiment 5

Figure 9:
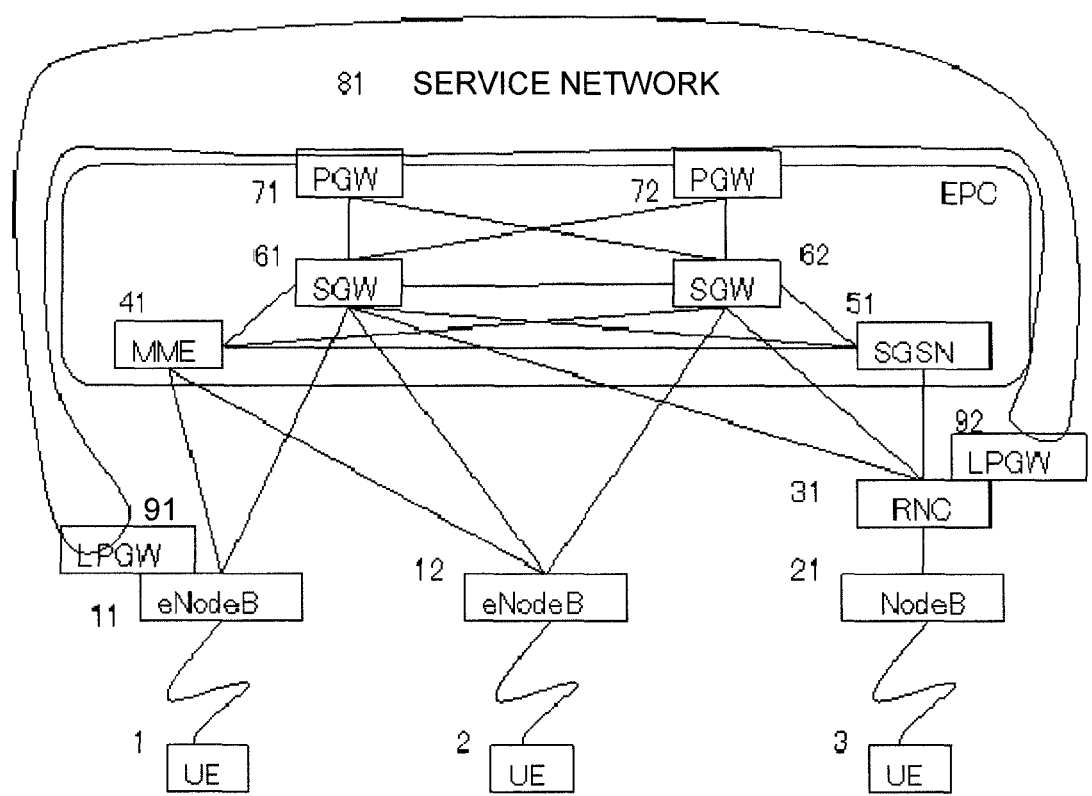
FIG. 9 is a diagram showing a configuration of an exemplary embodiment 5 of the present invention.
Figure 10:
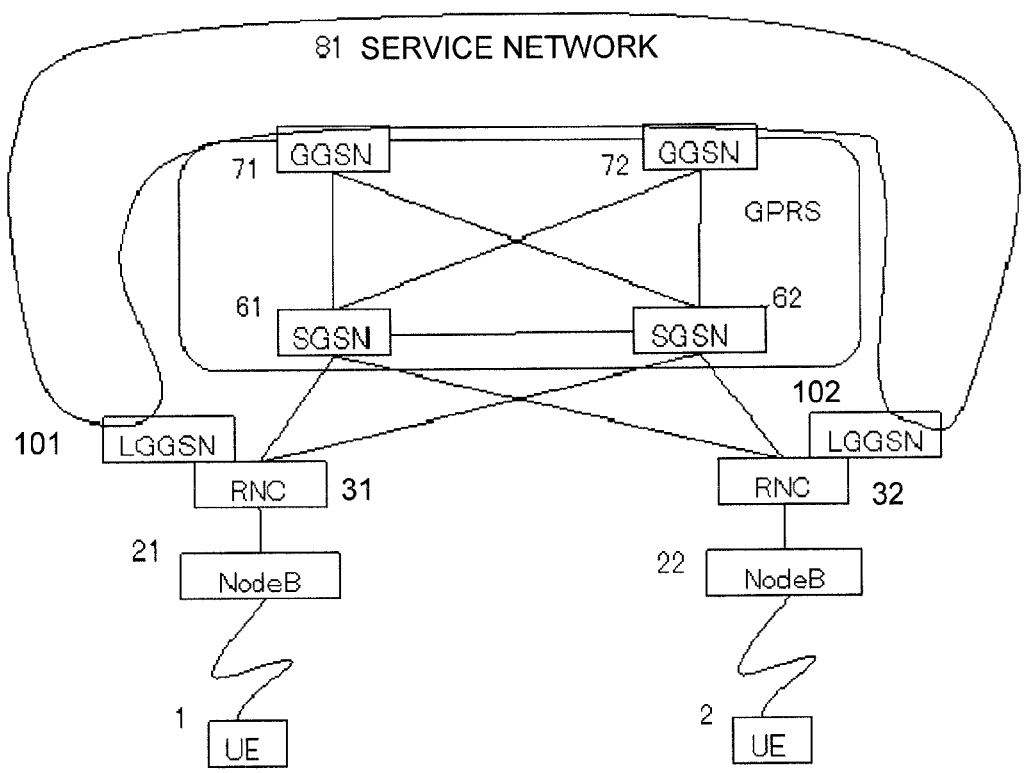
FIG. 10 is a diagram showing a configuration of an exemplary embodiment 6 of the present invention.

The following describes a utilization example of the present invention to a LIPA or SIPTO architecture. FIGS. 9 and 10 show the arrangement of the present exemplary embodiment.

Referring to FIG. 9, UE1 to UE3 are mobile phone apparatuses. eNodeB 11 and 12 are LTE base stations. NodeB 21 and RNC 31 are apparatuses for radio access (Radio Access) adopted by the UMTS system. An MME 41 is an apparatus introduced by EPC to manage the mobility. An SGSN 51 is a serving apparatus used for the UMTS, and may or may not handle a user plane depending upon connection configurations. In case the SGSN does not handle a user plane, the user plane is set between the SGW and the RNC.

SGWs 61 and 62 are apparatuses inside the service range that handle the user plane. The PGW 71 and 72 are gateway apparatuses that interconnect the external network (service network 81 in FIG. 9) and the EPC. LPGW (Local PGW 91 and 92) are gateway apparatuses that share certain portions in common with the eNodeB or that are located extremely close to the eNodeB and to allow connection to the service network 81.

In FIG. 10, UE1 and UE2 are mobile phone apparatuses. NodeB 21 and 22 and RNC 31 and 32 are apparatuses for radio access adopted in the UMTS system. SGSNs 61 and 62 are serving apparatuses and may or may not handle the user plane depending upon connection configurations. In case the SGSN does not handle a user plane, the user plane is set between the GGSN and RNC. It is noted that the configuration in which the user plane is set between the GGSN and RNC is called the 'direct tunnel connection'.

GGSNs 71 and 72 are gateway apparatuses that interconnect the external network (service network 81 in FIG. 10) and GPRS (General Packet Radio Service) network.

LGGSNs (Local GGSNs (Gateway GPRS Support Nodes)) 101 and 102 are gateway apparatuses that share certain portions in common with or are located extremely close to the RNCs (Radio Network Controllers) and that allow for connection to the service network 81.

Figure 11:
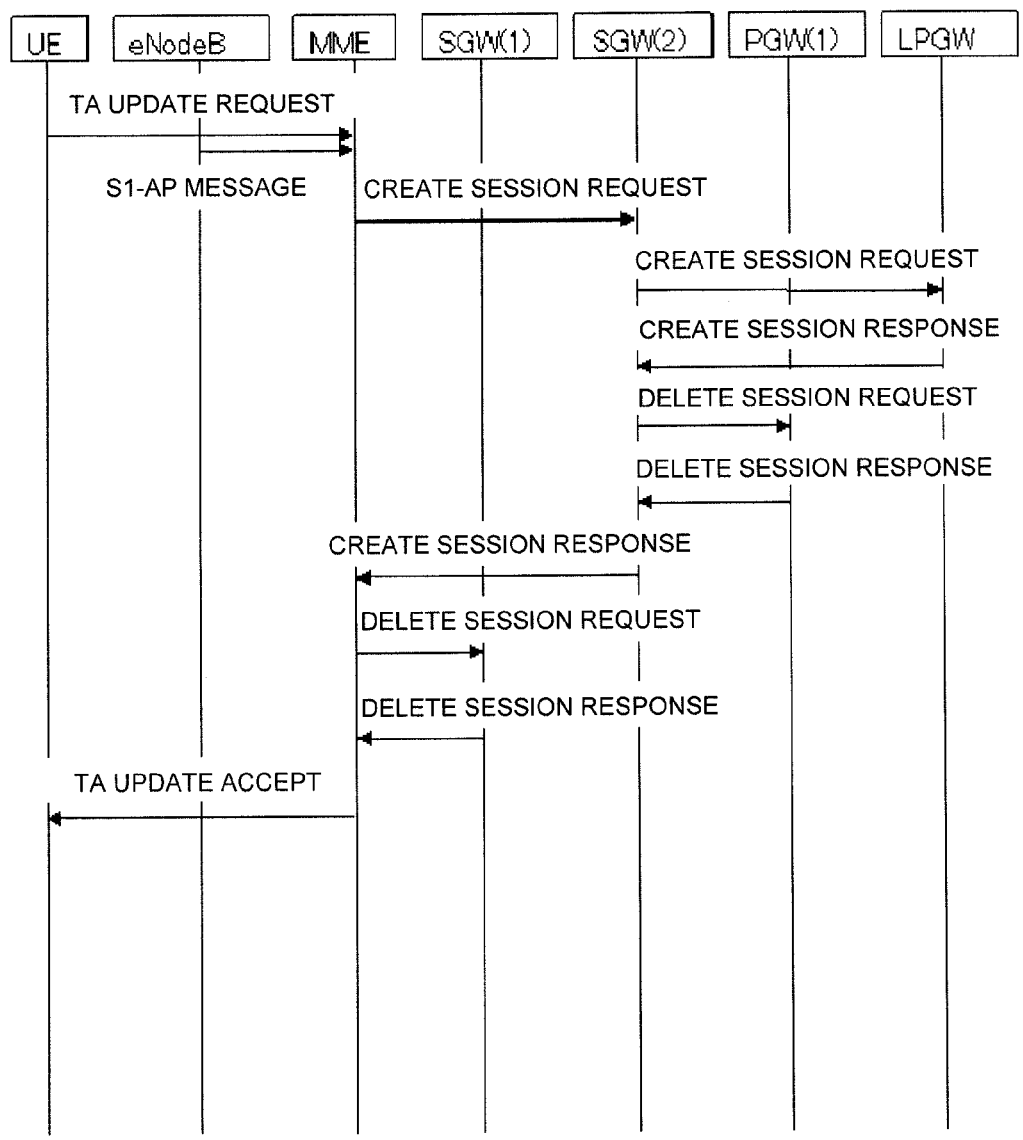
FIG. 11 is a diagram illustrating a sequence of the exemplary embodiment 5 of the present invention.

The following describes the operation of the fifth exemplary embodiment shown in FIG. 9, with reference to the sequence diagram shown in FIG. 11.

The MME receives a TA update request (TA Update Request) from the UE. In case the architecture is that of LIPA or SIPTO, the TA update request (TA Update Request) signal from the eNodeB to the MME is encapsulated in the S1-AP message for transmission.

At this time, the eNodeB notifies the MME on the S1-AP message of the fact that PDN connection may be set by the LIPA/SIPTO architecture.

In case the MME decides that the SGW needs to be changed, it sends a create session request (Create Session Request) to the SGW (2) which is a change-target SGW.

In case the MME decides that re-arrangement to LPGW is necessary, the MME selects an LPGW that may efficiently be connected to the external network (service network 81), and sets address information that designates the PGW, in the create session request (Create Session Request). It is noted that the above mentioned notification on the S1-AP message that PDN connection may be set by the LIPA/SIPTO architecture is by way of illustration only such that it is also possible for the MME to decide on the necessity for re-selection based on some other information.

On receipt of a new PGW address, the SGW (2) sends a create session request (Create Session Request) to the LPGW. On receipt of the create session request (Create Session Request), the LPGW creates a bearer context (Bearer Context).

The LPGW assigns a new IP address for the user to the UE.

On completion of assignment of the new IP address for the user and creation of the bearer context (Bearer Context), the LPGW sends a create session response (Create Session Response) to the SGW (2).

On receipt of the create session response (Create Session Response), the SGW (2) sends a delete session request (Delete Session Request) to the PGW(1).

The PGW (1) deletes the bearer context (Bearer Context) and sends a delete session response (Delete Session Response) to the SGW (2).

On receipt of the delete session response (Delete Session Response), the SGW (2) sends a create session response (Create Session Response) to the MME.

On receipt of the normal response from the LPGW, the MME sends a delete session request (Delete Session Request) to the SGW (1), a change-source SGW.

After deleting the bearer context (Bearer Context), the SGW (1) sends a delete session response (Delete Session Response) to the MME.

On receipt of the delete session response (Delete Session Response), the MME sends TA accept (TA Accept) to the UE. In this TA accept (TA Accept), IP address information, newly assigned to the user, is set and notified of the UE.

The foregoing description is for the case of using GTPv2 protocol between the SGW and the PGW. Similar functions may, however, be implemented using PMIPv6.

In this case, Proxy Binding Update is used in place of the create session request (Create Session Request)/delete session request (Delete Session Request). Also, proxy binding acknowledgement (Proxy Binding Acknowledgement) is used in place of the create session response (Create Session Response)/delete session response (Delete Session Response).

The sequence for LPGW re-selection is shown in FIG. 11. However, if the above function is to be implemented, it is necessary for the MME to re-select the PGW at an appropriate timing.

If, when the UE is engaged in packet communication, it is tried to change the PGW connected to the service network, the information such as the IP address is changed for the UE's counterpart of communication. As a result, the packet communication by the UE is disconnected. Thus, in the sequence operation shown in FIG. 11, it is necessary to re-select the PGW when the UE is not engaged in packet communication. That is, PGW re-selection is to be made during the ECM-IDLE time.

FIG. 11 shows the operation when the SGW is changed. However, even in case the SGW is not changed, the basic operation is the same. The message sequence, shown in FIG. 11, is explained in terms of message names for a case where the communication between the SGW and the PGW is implemented using GTP protocol. However, similar effects may also be obtained in case the communication between the SGW and the PGW is implemented using PMIP protocol.

If, in FIG. 11, the MME is substituted by the SGSN, and the eNodeB is substituted by RNC, the operation is that of PGW re-selection in case the access network is the UMTS.

In the present exemplary embodiment, as described above, packet communication services may be extended by LPGW re-selection as no user traffic is taken into the EPC. Hence, a mobile communication operator is able to reduce a load of an EPC network apparatus.

Exemplary Embodiment 6

Following describes a sixth exemplary embodiment of the present invention will now be described. The configuration of the present exemplary embodiment is that as shown FIG. 9. The following describes the operation of the present exemplary embodiment will now be set out with reference to FIG. 12.

The MME receives a TA update request (TA Update Request) from the UE. In the case of the LIPA/SIPTO architecture, a TA update request (TA Update Request) signal is encapsulated in the S1-AP message for communication from the eNodeB to the ME. The eNodeB sends to the MME a notification on the S1-AP message to the effect that PDN connection may be set based on the LIPA/SIPTO architecture.

The MME examines whether or not the PGW, the UE in question is connected to, is appropriate. It is noted that the above mentioned notification on the S1-AP message that setting of PDN connection by the LIPA/SIPTO architecture is possible is by way of illustration only such that it is also possible for the MME to decide on the necessity for re-selection of a new PGW based on some other information.

Figure 12:
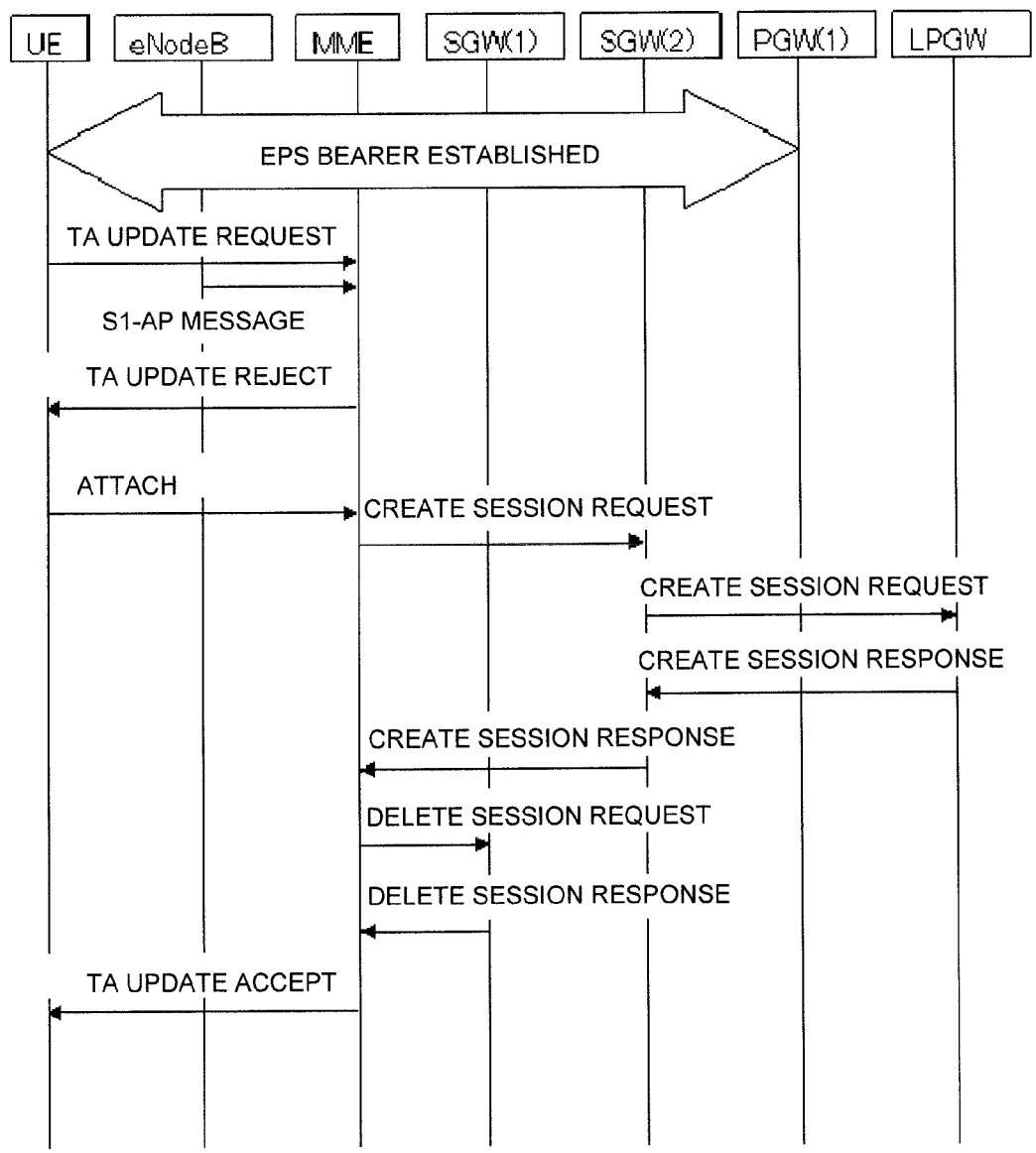
FIG. 12 is a diagram illustrating a sequence of the exemplary embodiment 6 of the present invention.

FIG. 12 shows a state in which the UE is connected to PGW (1) (EPS bearer originally established from the UE to the PGW (1)). In case the MME decides that LPGW re-selection is necessary, it sets a cause value that urges re-attach (AT-TACH) in the TA update request (TA Update Request) and returns a TA update reject (TA Update Reject) to the UE.

The UE is induced by the TA update reject (TA Update Reject) to send the ATTACH signal to the MME. This ATTACH signal is also encapsulated in the S1-AP message for transmission. The eNodeB sends to the MME a notification on the S1-AP message to the effect that PDN connection may be set based on the LIPA/SIPTO architecture.

It is now possible for the MME to newly start up the PGW selection logic. As a result, it becomes necessary to re-select LPGW.

FIG. 12 shows an example connection processing to LPGW re-selected. A create session request (Create Session Request) from the MME to the SGW (2) and LPGW, a create session response (Create Session Response) from the LPGW to the SGW (2) and MME, a delete session request (Delete Session Request) from the MME to the SGW (1), a delete session response (Delete Session Response) from the SGW (1) to the MME and a TA update accept from the MME to the UE, are sent.

In the present exemplary embodiment, as described above, packet communication services may be extended by LPGW re-selection as no user traffic is taken into EPC. Hence, a mobile communication operator is able to reduce a load of an EPC network apparatus.

Exemplary Embodiment 7

The following describes a seventh exemplary embodiment of the present invention will now be described. The configuration of the present exemplary embodiment is that as shown FIG. 9. The operation of the present exemplary embodiment will now be described with reference to FIG. 13. In the present exemplary embodiment, the regular TA update procedure is changed.

The MME receives a TA update request (TA Update Request) from the UE. It is noted that, in the case of the LIPA/SIPTO architecture, the TA update request (TA Update Request) signal from the eNodeB to the MME is encapsulated in the S1-AP message for transmission.

At this time, a notification is sent on the S1-AP message to the MME to the effect that PDN connection may be set based on the LIPA/SIPTO architecture. It is noted however that the notification sent on the S1-AP message to the effect that PDN connection may be set based on the LIPA/SIPTO architecture is by way of illustration only such that it is also possible for the MME to decide on the necessity for re-selection of a new PGW based on some other information.

The TA update accept (TA Update Accept) signal that notifies the completion of the TA update procedure from the MME to the UE is added by new information (PDN in FIG. 13) to urge re-connection of the packet data network (PDN) which is currently in a connected state. On receipt of the TA update accept (TA Update Accept) signal added by the new information (PDN), the UE recognizes the PDN (packet data network) for re-connection, based on the information specified. It is noted that a plurality of PDNs may sometimes be so added. For the PDN in question, the UE starts up the conventional UE requested PDN connection processing or the UE requested PDN connectivity processing to re-connect the packet data network (PDN).

In this re-connection of the packet data network (PDN), it is possible for the MME to newly start up the PGW selection logic, as a result of which it becomes necessary to re-select an optimum PGW.

Figure 13:
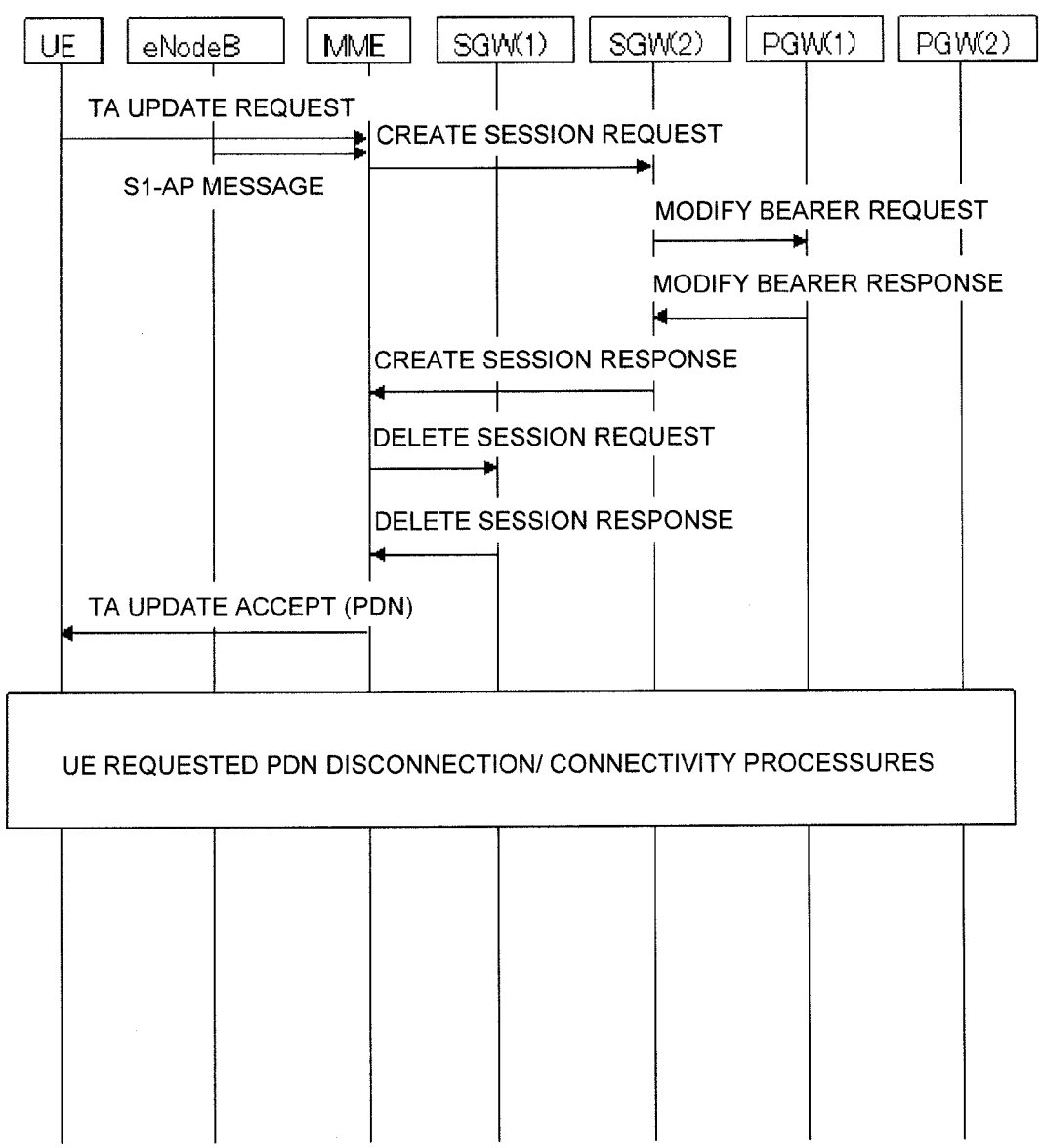
FIG. 13 is a diagram illustrating a sequence of an exemplary embodiment 7 of the present invention.

The operation for the case where the SGW is to be changed has been explained with reference to FIG. 13. However, even when the SGW is not changed, the basic operation remains the same.

In the present exemplary embodiment, as described above, packet communication services may be extended by LPGW re-selection as no user traffic is taken into EPC. Hence, mobile communication operator is able to reduce a load of an EPC network apparatus.

Exemplary Embodiment 8

The following describes an eighth exemplary embodiment of the present invention. The configuration of the present exemplary embodiment is that as shown FIG. 10. The operation of the present exemplary embodiment will now be described with reference to FIG. 14.

The SGSN (Serving GPRS Support Node) receives an RA (Routing Area) update request (RA Update Request) from the UE. In the case of the LIPA/SIPTO architecture, the RA update request signal from the NodeB to the SGSN is encapsulated in a RANUP (Radio Access Network Access Part) message for transmission. The RRC sends to the SGSN a notification on the RANAP message to the effect that PDN connection may be set based on the LIPA/SIPTO architecture.

The SGSN examines whether or not the GGSN (Gateway GPRS Support Node), the UE in question is connected to, is appropriate. It is noted that the above mentioned notification on the RANAP message that PDN connection setting by the LIPA/SIPTO architecture is possible is only by way of illustration. That is, it is also possible for the MME to decide on the necessity for re-selection of a new PGW based on some other information.

Figure 14:
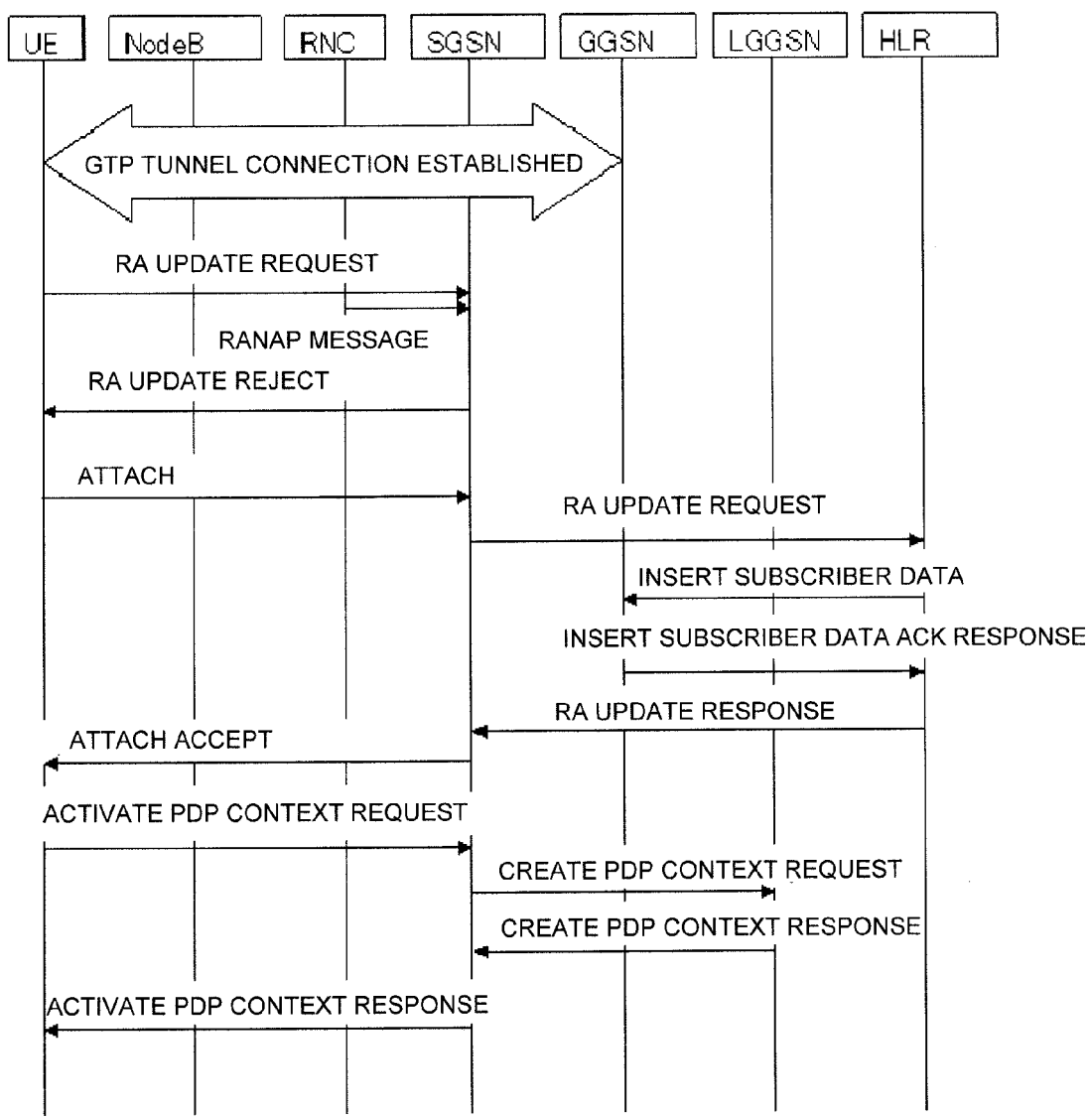
FIG. 14 is a diagram illustrating a sequence of an exemplary embodiment 8 of the present invention.

FIG. 14 shows a state in which the UE is connected to GGSN (GTP tunnel connection is established between UE and GGSN: see 'GTP Tunneling originally established' of FIG. 14).

In case the SGSN decides that LGGSN re-selection is necessary, the SGSN sets a reason value (cause value) that urges re-attach (ATTACH) in the RA update request (RA Update Request) to send back an RA update reject (RA Update Reject) signal to the UE.

The UE is caused by the RA update reject (RA Update Reject) signal to send the ATTACH signal to the SGSN to try to re-attach (ATTACH) to the GPRS network. The SGSN sends an RA update request (RA Update Request) to an HLR (Home Location Register). An insert subscriber data (Insert Subscriber data) is sent from the HLR to the GGSN. The GGSN sends back an insert subscriber data acknowledge (Insert Subscriber data ack) response to the HLR. On receipt of the ack response (ack), the HLR sends back an RA update response (RA Update Response) to the SGSN. The SGSN sends back an ATTACH accept (ATTACH Accept) to the UE.

The UE then sends a request for activating PDP context (Activate PDP context request), requesting PDP (Packet Data Protocol) connection, to the SGSN.

On receipt of the request for activating PDP context (Activate PDP context request), the SGSN decides whether or not the connection to LGGSN is appropriate. When the SGSN decides that the connection to LGGSN is appropriate, the SGSN performs creation of a GTP (GPRS Tunneling Protocol) tunnel to the LGGSN (Create PDP context request). The Create PDP context request is sent back from the LGGSN to the SGSN, and a PDP context activate response (Activate PDP context response) is sent back from SGSN to the UE to enable connection between UE and LGGSN.

In the present exemplary embodiment, as described above, packet communication services may be extended by LPGW re-selection as no user traffic is taken into the EPC. Hence, a mobile communication operator is able to reduce a load of a GPRS network apparatus.

The particular exemplary embodiments or examples may be changed or adjusted within the gamut of the entire disclosure of the present invention, inclusive of claims, based on the fundamental technical concept of the invention. Further, variegated combinations or selection of elements disclosed herein may be made within the framework of the claims. That is, the present invention may encompass various modifications or corrections that may occur to those skilled in the art in accordance with and within the gamut of the entire disclosure of the present invention, inclusive of claim and the technical concept of the present invention.

What is claimed is:

1. A communication method for Local IP Access (LIPA) or Selected IP Traffic Offload (SIPTO) architecture, the method comprising:
   a mobility management entity (MME) sending a signal to a user equipment (UE) for making the UE re-attach, when the MME decides that it is necessary to re-locate a gateway apparatus for the UE in response to movement of the UE;
   the UE, on receipt of the signal, re-attaching; and
   the MME selecting a new packet data network gateway by the re-attaching.

2. The communication method according to claim 1, wherein the MME further selects a new serving gateway apparatus (SGW) by the re-attaching.

3. The communication method according to claim 1, wherein the UE initiates the re-attaching by sending an attach signal toward the MME.

4. The communication method according to claim 1, wherein the MME decides that it is necessary to re-locate a gateway apparatus for the UE by receiving a tracking area (TA) update request signal from the UE with the movement of the UE.

5. The communication method according to claim 1, wherein the MME selects the new PGW for more efficient connection between the UE and the PGW by the re-attaching.

6. A communication system for Local IP Access (LIPA) or Selected IP Traffic Offload (SIPTO) architecture, the system comprising:
   a mobility management entity (MME) that sends a signal to a user equipment (UE) for making the UE re-attach, when the MME decides that it is necessary to re-locate a gateway apparatus for the UE in response to movement of the UE; and
   the UE that, on receipt of the signal, attaches,
   wherein the MME selects a new packet data network gateway (PGW) by the re-attaching.

7. The communication system according to claim 6, wherein the MME further selects a new serving gateway apparatus (SGW) by the re-attaching.

8. The communication system according to claim 6, wherein the UE initiates the re-attaching by sending an attach signal toward the MME.

9. The communication system according to claim 6, wherein the MME decides that it is necessary to re-locate a gateway apparatus for the UE by receiving a tracking area (TA) update request signal from the UE with the movement of the UE.

10. The communication system according to claim 6, wherein the MME selects the new PGW for more efficient connection between the UE and the PGW by the re-attaching.

11. A user equipment in a communication system for Local IP Access (LIPA) or Selected IP Traffic Offload (SIPTO) architecture, wherein the user equipment (UE) receives a signal from a mobility management entity (MME) for making the UE re-attach, when the MME decides that is necessary to locate a gateway apparatus for the UE in response to movement of the UE, and re-attaches to cause the MME to select a new packet data network gateway (PGW).

12. The user equipment according to claim 11, wherein the re-attaching causes the MME to further select a new serving gateway (SGW).

13. The user equipment according to claim 11, wherein the UE initiates the re-attaching by sending an attach signal toward the MME.

14. The user equipment according to claim 11, wherein the UE makes the MME decide that it is necessary to re-locate a gateway apparatus for the UE by sending a tracking area (TA) update request signal from the UE with the movement of the UE.

15. The user equipment according to claim 11, wherein the UE makes the MME select the new PGW for more efficient connection between the UE and the PGW by the re-attaching.

\* \* \* \* \*

UNITED STATES PATENT AND TRADEMARK OFFICE
CERTIFICATE OF CORRECTION

| | |
|---|---|
| PATENT NO. | : 8,750,221 B2 |
| APPLICATION NO. | : 13/118743 |
| DATED | : June 10, 2014 |
| INVENTOR(S) | : Hajime Zembutsu et al. |

It is certified that error appears in the above-identified patent and that said Letters Patent is hereby corrected as shown below:

On the Title Page, References Cited, Other Publications

Page 2 Col. 1, Line 17: Delete "Systems" and insert -- System --

Page 2 Col. 1, Line 19: Delete "(Release9)"," and insert -- (Release 9)", --

Page 2 Col. 2, Line 4: Delete "Systems" and insert -- System --

Page 2 Col. 2, Line 8: Delete "correpsonding" and insert -- corresponding --

In the Specification

Column 2, Line 18: After "provided" delete "in one aspect of the present invention, there is provided"

Column 6, Line 26: Delete "SWG" and insert -- SGW --

Column 7, Line 64: Delete "SGM" and insert -- SGW --

Column 8, Line 60: Delete "effect:" and insert -- effect. --

In the Claims

Column 14, Line 57: In Claim 6, delete "attaches," and insert -- re-attaches, --

Column 15, Line 11: In Claim 11, delete "is" and insert -- it is --

Column 15, Line 12: In Claim 11, delete "locate" and insert -- re-locate --

Signed and Sealed this
Eleventh Day of November, 2014

Michelle K. Lee
*Deputy Director of the United States Patent and Trademark Office*